US005623538A

United States Patent [19]

Petty

[11] Patent Number: 5,623,538

[45] Date of Patent: Apr. 22, 1997

[54] SHARED DISTRIBUTION OF INTERNAL MESSAGE STORAGE FACILITIES BY A PLURALITY OF COMMUNICATION TERMINALS

[75] Inventor: Norman W. Petty, Boulder, Colo.

[73] Assignee: Lucent Technologies Inc., Murray Hill, N.J.

[21] Appl. No.: 520,910

[22] Filed: Aug. 30, 1995

[51] Int. Cl.$^{6}$ .................................................. H04M 1/64

[52] U.S. Cl. .......................... 379/67; 379/93; 379/100; 395/200.07; 395/200.09; 348/14

[58] Field of Search .............................. 379/67, 88, 89, 379/100, 201, 207, 93; 348/7, 14; 395/200.07, 200.09

[56] References Cited

U.S. PATENT DOCUMENTS

| | | | |
|---|---|---|---|
| 4,975,829 | 12/1990 | Clarey et al. | 364/200 |
| 5,029,199 | 7/1991 | Jones et al. | 379/89 |
| 5,193,110 | 3/1993 | Jones et al. | 379/94 |
| 5,278,897 | 1/1994 | Mowery et al. | 379/212 |
| 5,317,627 | 5/1994 | Richardson, Jr. et al. | 379/88 |
| 5,317,628 | 5/1994 | Misholi et al. | 379/89 |
| 5,367,564 | 11/1994 | Sutoh et al. | 379/100 |
| 5,448,285 | 9/1995 | Kadowski | 348/14 |
| 5,475,738 | 12/1995 | Penzias | 379/67 |
| 5,509,061 | 4/1996 | Amereller et al. | 379/207 |
| 5,524,137 | 6/1996 | Rhee | 379/67 |
| 5,528,281 | 6/1996 | Grady et al. | 348/7 |

FOREIGN PATENT DOCUMENTS

| | | | |
|---|---|---|---|
| 0105441 | 4/1984 | European Pat. Off. | H04Q 3/42 |
| 0480634 | 4/1992 | European Pat. Off. | H04Q 11/04 |

OTHER PUBLICATIONS

K. M. Huber et al., *Getting The Message with UMS,* AT&T Technology, vol. 1, No. 1, pp. 26–35, undated.

*Primary Examiner*—Krista M. Zele
*Assistant Examiner*—Daniel S. Hunter
*Attorney, Agent, or Firm*—John C. Moran

[57] ABSTRACT

Initially storing multimedia messages from an originating communication terminal to a destination communication terminal on the destination communication terminal. If the destination communication terminal cannot store messages, then the message is stored on the originating communication terminal. The destination communication terminal may not be able to store messages because it no longer has present message storage facilities on an internal storage unit or it does not have any internal storage capability for messages. Similarly, the originating communication terminal also may have exceeded its capacity to store messages or may not have any internal storage devoted to the storing of messages. The destination communication terminal maintains a list of messages that are stored on other communication terminals. In addition, if the originating communication terminal cannot store messages, a message is stored on a third terminal which has the capacity to store messages. The messages stored on the third communication terminal are encrypted to protect the privacy of users of the originating and destination communication terminals.

42 Claims, 8 Drawing Sheets

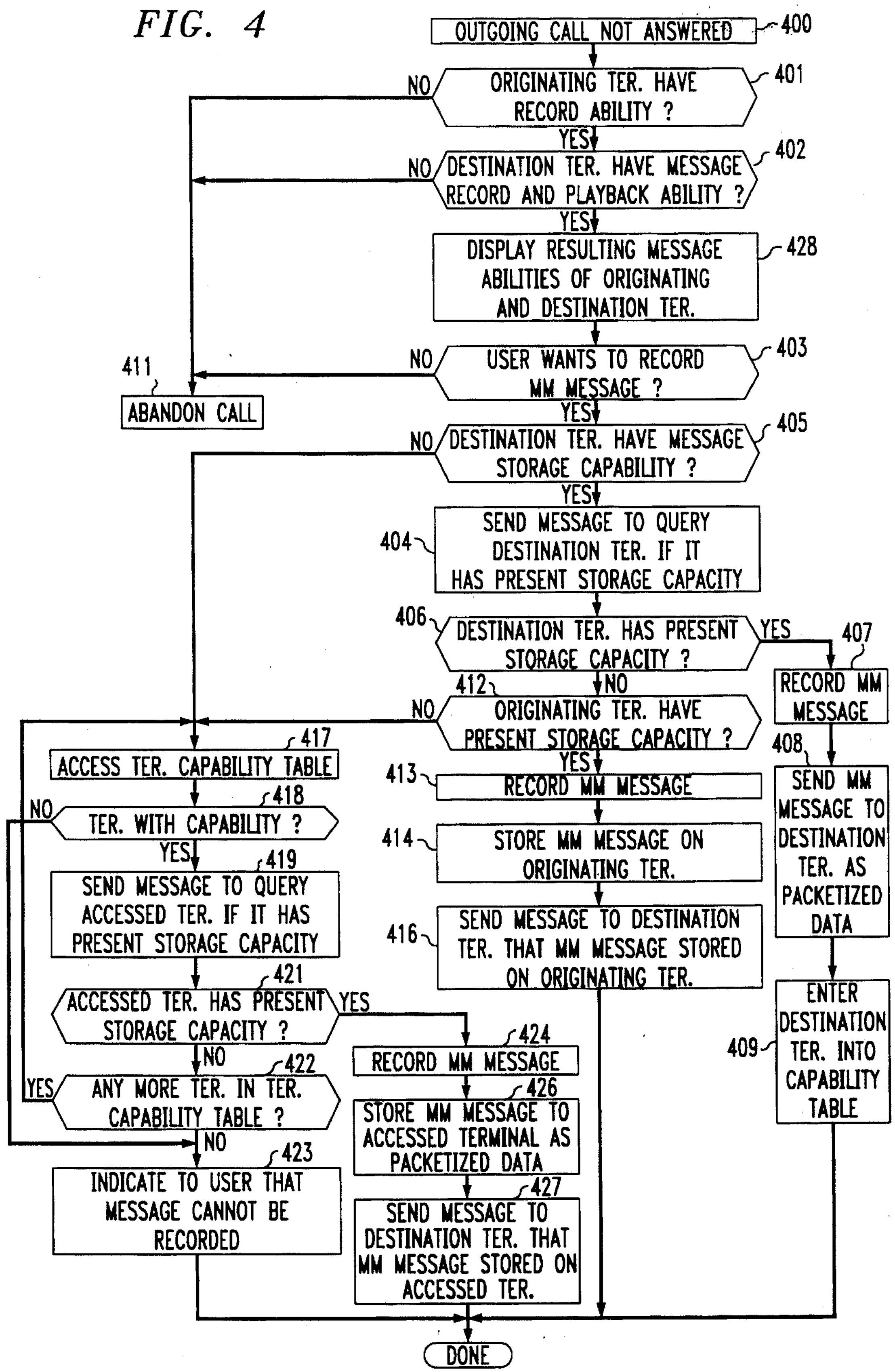

FIG. 4
OUTGOING CALL NOT ANSWERED
400
ORIGINATING TER. HAVE RECORD ABILITY ?
401
NO
YES
DESTINATION TER. HAVE MESSAGE RECORD AND PLAYBACK ABILITY ?
402
NO
YES
DISPLAY RESULTING MESSAGE ABILITIES OF ORIGINATING AND DESTINATION TER.
428
USER WANTS TO RECORD MM MESSAGE ?
403
NO
YES
411
ABANDON CALL
DESTINATION TER. HAVE MESSAGE STORAGE CAPABILITY ?
405
NO
YES
SEND MESSAGE TO QUERY DESTINATION TER. IF IT HAS PRESENT STORAGE CAPACITY
404
DESTINATION TER. HAS PRESENT STORAGE CAPACITY ?
406
YES
NO
407
RECORD MM MESSAGE
408
SEND MM MESSAGE TO DESTINATION TER. AS PACKETIZED DATA
ENTER DESTINATION TER. INTO CAPABILITY TABLE
409
ORIGINATING TER. HAVE PRESENT STORAGE CAPACITY ?
412
NO
YES
RECORD MM MESSAGE
413
STORE MM MESSAGE ON ORIGINATING TER.
414
SEND MESSAGE TO DESTINATION TER. THAT MM MESSAGE STORED ON ORIGINATING TER.
416
ACCESS TER. CAPABILITY TABLE
417
TER. WITH CAPABILITY ?
418
NO
YES
SEND MESSAGE TO QUERY ACCESSED TER. IF IT HAS PRESENT STORAGE CAPACITY
419
ACCESSED TER. HAS PRESENT STORAGE CAPACITY ?
421
YES
NO
ANY MORE TER. IN TER. CAPABILITY TABLE ?
422
YES
NO
INDICATE TO USER THAT MESSAGE CANNOT BE RECORDED
423
RECORD MM MESSAGE
424
STORE MM MESSAGE TO ACCESSED TERMINAL AS PACKETIZED DATA
426
SEND MESSAGE TO DESTINATION TER. THAT MM MESSAGE STORED ON ACCESSED TER.
427
DONE

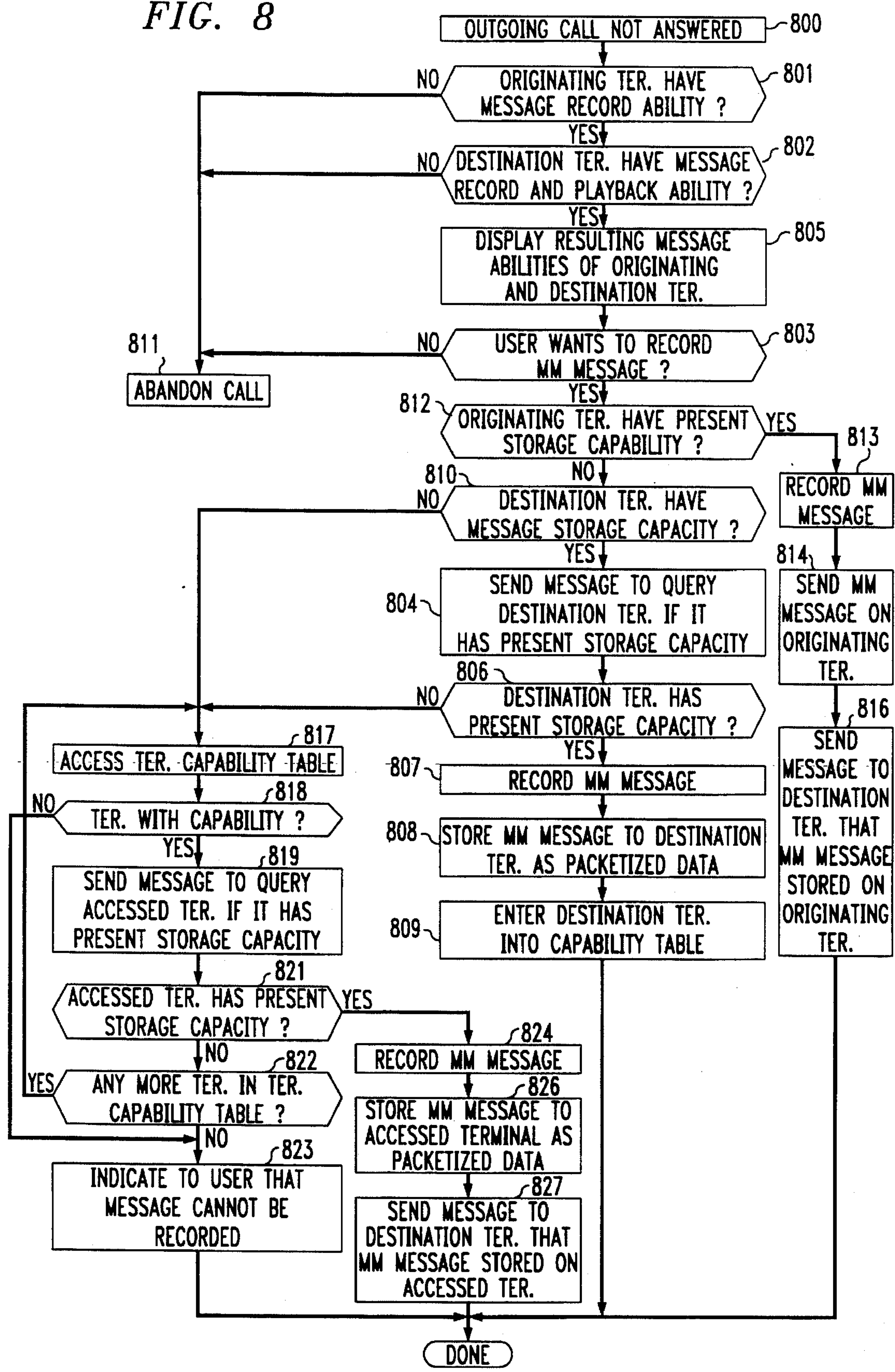
FIG. 8
OUTGOING CALL NOT ANSWERED
800
ORIGINATING TER. HAVE MESSAGE RECORD ABILITY ?
801
NO
YES
DESTINATION TER. HAVE MESSAGE RECORD AND PLAYBACK ABILITY ?
802
NO
YES
DISPLAY RESULTING MESSAGE ABILITIES OF ORIGINATING AND DESTINATION TER.
805
USER WANTS TO RECORD MM MESSAGE ?
803
NO
YES
811
ABANDON CALL
812
ORIGINATING TER. HAVE PRESENT STORAGE CAPABILITY ?
YES
NO
813
RECORD MM MESSAGE
810
DESTINATION TER. HAVE MESSAGE STORAGE CAPACITY ?
NO
YES
814
SEND MM MESSAGE ON ORIGINATING TER.
804
SEND MESSAGE TO QUERY DESTINATION TER. IF IT HAS PRESENT STORAGE CAPACITY
806
DESTINATION TER. HAS PRESENT STORAGE CAPACITY ?
NO
YES
816
SEND MESSAGE TO DESTINATION TER. THAT MM MESSAGE STORED ON ORIGINATING TER.
817
ACCESS TER. CAPABILITY TABLE
807
RECORD MM MESSAGE
818
TER. WITH CAPABILITY ?
NO
YES
808
STORE MM MESSAGE TO DESTINATION TER. AS PACKETIZED DATA
819
SEND MESSAGE TO QUERY ACCESSED TER. IF IT HAS PRESENT STORAGE CAPACITY
809
ENTER DESTINATION TER. INTO CAPABILITY TABLE
821
ACCESSED TER. HAS PRESENT STORAGE CAPACITY ?
YES
NO
824
RECORD MM MESSAGE
822
ANY MORE TER. IN TER. CAPABILITY TABLE ?
YES
NO
826
STORE MM MESSAGE TO ACCESSED TERMINAL AS PACKETIZED DATA
823
INDICATE TO USER THAT MESSAGE CANNOT BE RECORDED
827
SEND MESSAGE TO DESTINATION TER. THAT MM MESSAGE STORED ON ACCESSED TER.
DONE

SHARED DISTRIBUTION OF INTERNAL MESSAGE STORAGE FACILITIES BY A PLURALITY OF COMMUNICATION TERMINALS

TECHNICAL FIELD

This invention relates to telecommunication switching and, in particular, to the provision of messaging services for communication terminals.

BACKGROUND OF THE INVENTION

It is well known in the prior art to attach to an individual station set an answering machine. Modern answering machines have many of the characteristics associated with voice messaging systems. The problem with answering machines is that each answering machine has a finite amount of storage for voice messages. Once the storage for voice messages is exceeded, the answering machines have no mechanism for storing additional messages on other answering machines or at a central location. Further, multimedia message service cannot be provided on present answering machines. Also, known in the prior art is the use of voice messaging systems.

Multimedia messaging systems are starting to become available. The problem with such systems is that in order to start providing messaging services an expensive system has to be purchased. Thus, it is not possible for a company to gradually provide voice or multimedia message service without the investment of a large amount of money. Initially, multimedia messaging may only be required by a few in a large telecommunication switching system. Further, multimedia messaging services will not be introduced in the public switching network for a long time.

There exists then a need for a messaging service that is distributed and yet can utilize the existing public telephone network or a private telephone network without modifications being made to that network.

SUMMARY OF THE INVENTION

The foregoing problems are solved, and a technical advance is achieved by an apparatus and method in which messages from an originating communication terminal to a destination communication terminal are initially stored on the destination communication terminal. If the destination communication terminal cannot store messages, then a message is stored on the originating communication terminal. The destination communication terminal may not be able to store messages because it no longer has present message storage facilities on an internal storage unit or it does not have any internal storage capability for messages. Similarly, the originating communication terminal also may have exceeded its capacity to store messages or may not have any internal storage devoted to the storing of messages. The destination communication terminal maintains a list of messages that are stored on other communication terminals. In addition, if the originating communication terminal cannot store messages, a message is stored on a third terminal which has the capacity to store messages. The messages stored on the third communication terminal are encrypted to protect the privacy of users of the originating and destination communication terminals.

Other and further aspects of the present invention will become apparent during the course of the following description and by reference to the accompanying drawing.

BRIEF DESCRIPTION OF THE DRAWING

FIG. 4 illustrates, in flow chart form, operations of a messaging application in an originating communication terminal for the first embodiment;

FIG. 8 illustrates, in flow chart form, operations of a messaging application in an originating communication terminal for a second embodiment;

DETAILED DESCRIPTION

Figure 1:
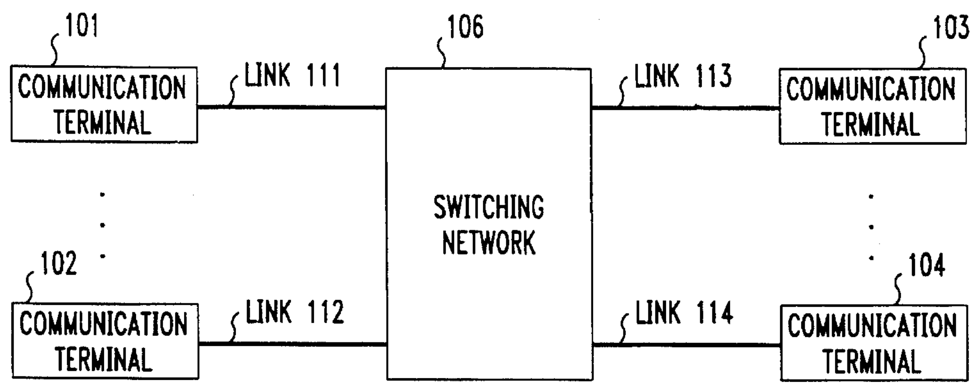
FIG. 1 illustrates a plurality of communication terminals interconnected by a switching network.

FIG. 1 illustrates a plurality of communication terminals interconnected by switching network 106. In the present description, communication terminals 101–102 and communication terminals 103–104 are assumed to be interconnected to switching network 106 utilizing ISDN links such as basic rate interface (BRI) or primary rate interfaces (PRI) links. However, one skilled in the art could easily envision the use of other types of links. Switching network 106 may be the public telephone network or it may be a private switching network such as that disclosed in U.S. Pat. No. 5,386,466. Each communication terminal has the capability of storing a finite number of messages. The communication terminals are described in greater detail later.

To understand how the communication terminals of FIG. 1 function, please consider the following examples of two embodiments. In the first embodiment, originating communication terminal will initially attempt to store the multimedia message on the destination communication terminal. Communication terminal 101 places a call to communication terminal 104. The user of communication terminal 104 does not respond to the incoming call. Communication terminal 104 transmits a message to communication terminal 101 designating that it's user has not responded to the incoming call but that communication terminal 104 has the capability of storing a multimedia message. Communication terminal 101 is responsive to the message from communication terminal 104 to inform the user of communication terminal 101 that a message can be stored for communication terminal 104. If the user of communication terminal 104 chooses to leave a multimedia message, that multimedia message is recorded by communication terminal 101 and then sent as packetized data to communication terminal 104. One skilled in the art could readily envision other methods of transferring the recorded message to communication terminal 104 than as packetized data. If communication terminal 104 does not have the capacity or ability to store a message, the multimedia message from communication terminal 104 to communication terminal 101 specifies this incapacity or inability. Communication terminal 101 then stores the recorded multimedia message internal to communication terminal 101 assuming it can store the message and sends a message informing communication terminal 104 that the multimedia message had been recorded and stored by communication terminal 101. At a later point in time, if communication terminal 104 has capacity to store the multimedia message, communication terminal 104 requests the multimedia message from communication terminal 101.

When the user of communication terminal 104 wishes to access the stored multimedia message, if the multimedia message is stored on communication terminal 104, then the user can directly access the stored multimedia message. If the multimedia message has been stored on communication terminal 101, communication terminal 104 accesses the multimedia message from communication terminal 101 and then gives the user of communication terminal 104 access to the stored multimedia message.

If communication terminal 101 does not have the ability or present capacity to record the multimedia message, a path is set up through switching network 106 so that the user of communication terminal 101 initially records the multimedia message by interacting with communication terminal 104 and communication terminal 104 stores the multimedia message.

In the second embodiment, after the multimedia message had been recorded, communication terminal 101 first attempts to store the multimedia message internal to communication terminal 101. If communication terminal 101 does not have internal storage capacity or ability, communication terminal 101 queries communication terminal 104 to see if communication terminal 104 has the ability and capacity to store the recorded multimedia message. If communication terminal 104 has the ability and capacity to store the recorded multimedia message, then communication terminal 101 transmits the recorded multimedia message to communication terminal 104 as packetized data.

In either of the above-described embodiments, if neither communication terminal 101 nor communication terminal 104 has the ability or capacity to store the recorded multimedia message, communication terminal 101 attempts to store the recorded multimedia message on one of the other communication terminals such as communication terminal 102. Communication terminal 101 can only store multimedia messages on another communication terminal if communication terminal 101 has become aware that the other communication terminal has the facilities for storing multimedia messages. A communication terminal stores in a table the identity of communication terminals that in the past have indicated that they have facilities for storing multimedia messages. If neither communication terminal 101 nor communication terminal 104 has the ability and capacity to store the recorded multimedia message, communication terminal 101 accesses its stored table of communication terminals that have the facilities for storing multimedia messages. If communication terminals 102 and 103 are listed in the table, communication terminal 101 sends a message to communication terminal 102 to determine if communication terminal 102 has the capacity to store the recorded multimedia message. If communication terminal 102 does not have the capacity, communication terminal 101 sends a message to communication terminal 103 to check if that communication terminal can store the recorded multimedia message. If communication terminal 103 can store the message, communication terminal 101 transfers the recorded multimedia message to communication terminal 103. Communication terminal 101 then sends a message informing communication terminal 104 that the recorded multimedia message is stored on communication terminal 103. Note, that the actual recording of the multimedia message would also have been transferred to communication terminal 103 if communication terminal 101 did not have the ability to perform this function. Also note, that in the first embodiment described in the previous paragraphs, communication terminal 104 performs the actions of communication terminal 101. In addition, a multimedia message stored on either communication terminal 102 or 103 is encrypted with only communication terminal 104 having the encryption key. The encryption is done so as to preserve the privacy of the user of communication terminal 104 as well as the user of communication terminal 101.

A broadcast message is a message recorded by a user for a number of destination communication terminals. In both of the above embodiments, if the user of communication terminal 101 wishes to send a broadcast message to destination communication terminals 102–104, the user of communication terminal 101 first records a multimedia message on communication terminal 101 which then stores the multimedia message internally in communication terminal 101 assuming that it has the ability to record and storage capacity to store. Communication terminal 101 then sends a message to each of the other communication terminals informing them that there is a stored message on communication terminal 101 for each of the destination communication terminals. Upon a user wishing to access the broadcast message, the destination communication terminal requests that the broadcast message be transmitted as packetized data to the destination communication terminal for playback to the user. If the communication terminal originating the broadcast message does not have the ability to record or capacity to store the broadcast message internally, it will find another communication terminal that can record and store the message. For example, communication terminal 101 may record and store its broadcast multimedia message on communication terminal 102. Communication terminals 103 and 104 are then directed to communication terminal 102 to obtain the broadcast message when their users wish to playback the broadcast message.

Figure 2:
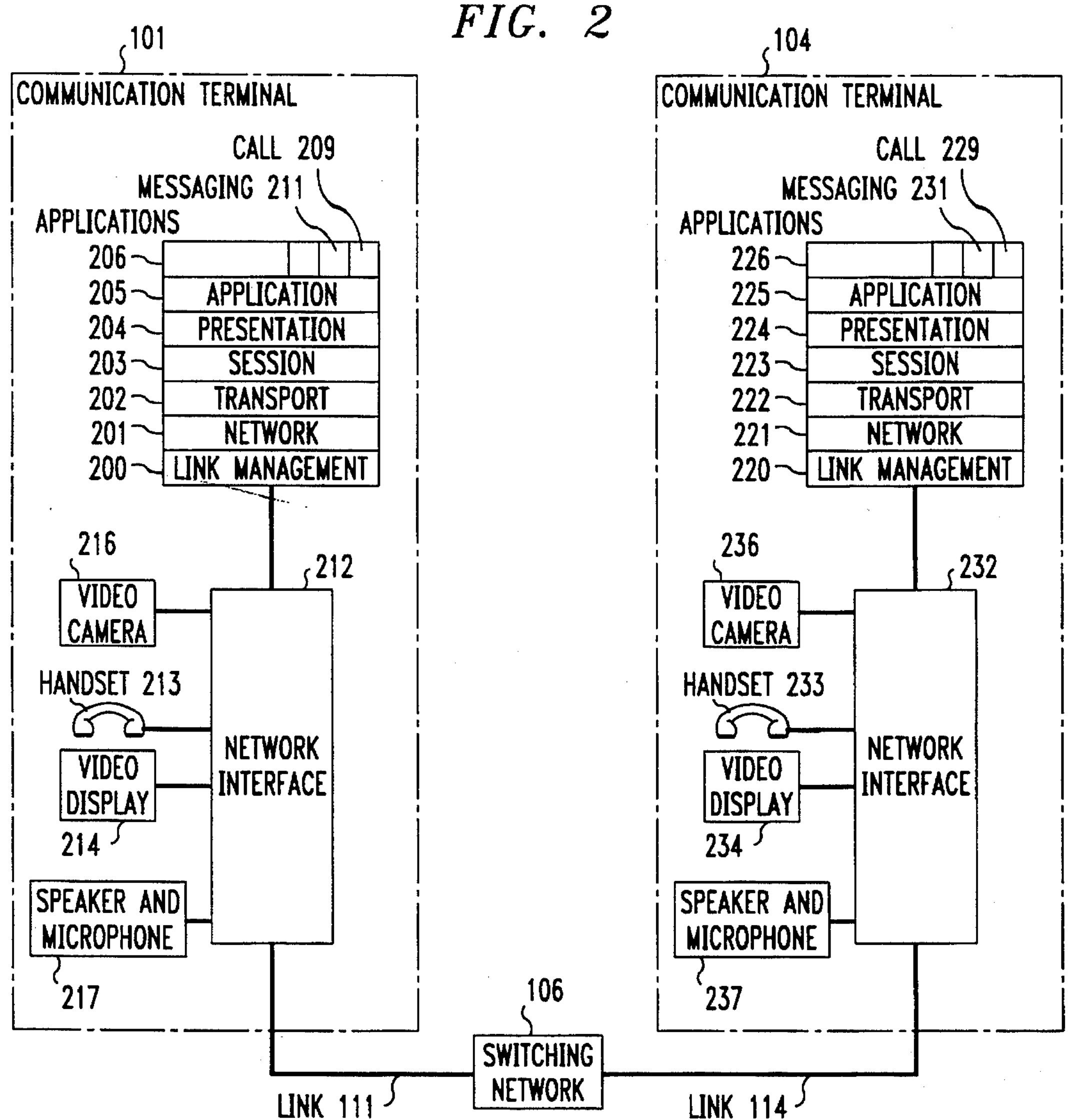
FIG. 2 illustrates the software architecture of two communication terminals.
Figure 3:
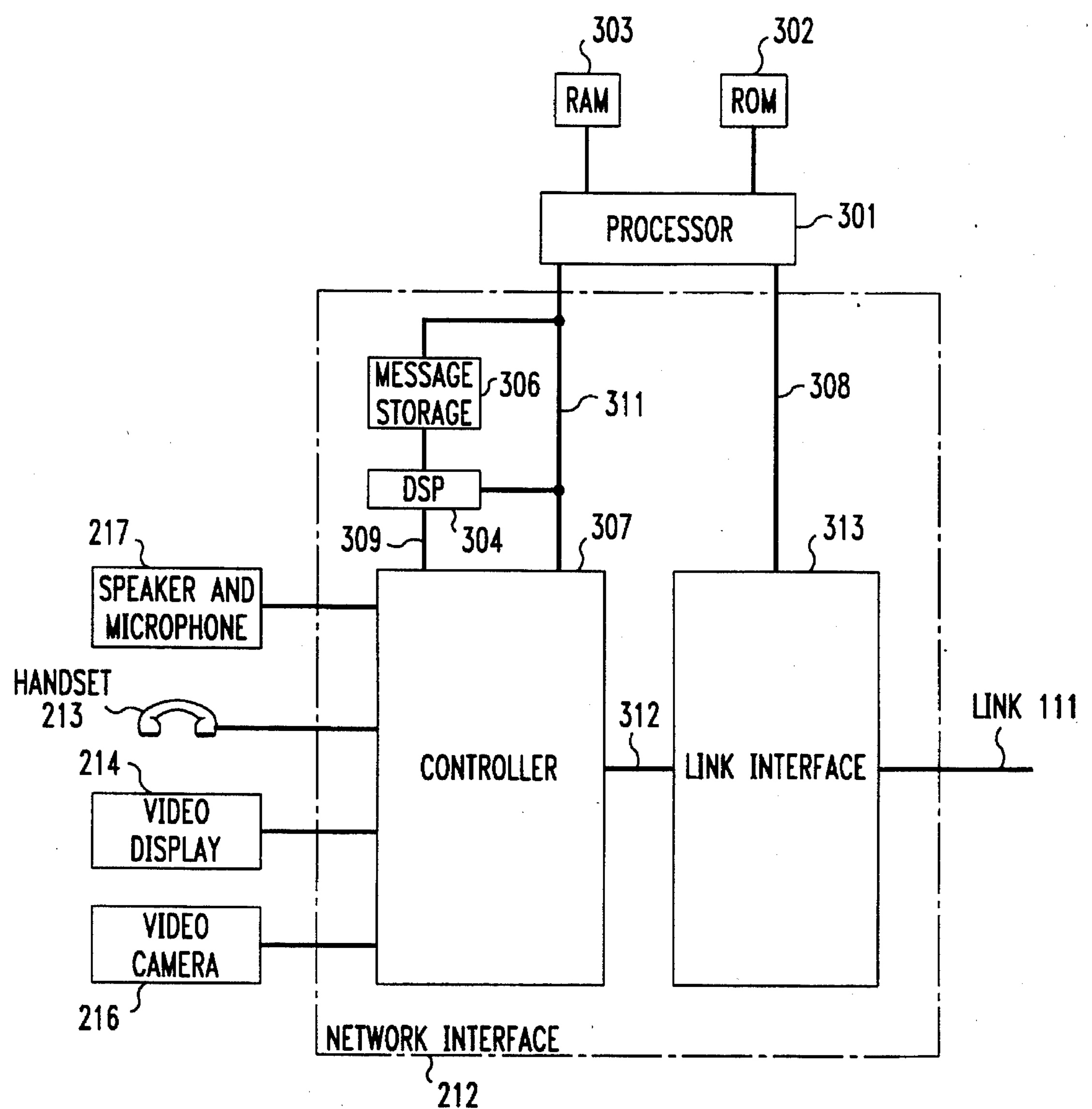
FIG. 3 illustrates a communication terminal in greater detail.

FIG. 2 illustrates the internal details of communication terminals 101 and 104. Communication terminals 101 and 104 are illustrated as having the capacity to store a multimedia message and also the ability to record such a multimedia message. The functions performed by software layers 200–206 are described in greater detail in U.S. Pat. No. 5,386,466 which is hereby incorporated by reference. FIG. 3 illustrates in greater detail the hardware configuration of communication terminal 101. To understand the operation of the communication terminals with respect to FIG. 2, consider the previous example for the first embodiment. Call application 209 is utilized to place the call by sending a setup message to communication terminal 104. Call application 209 utilizes software layers 200–205 as set forth in the above-referenced patent. Communication terminal 104 is responsive to the setup message received from communication terminal 101 to process this setup message in the standard manner and to terminate the message on call application 229. Call application 229 then alerts the user of the communication terminal 104 and sends back an alerting message to call application 209. The alerting message specifies that communication terminal 104 can accept a multimedia message. The alerting message also specifies the type of multimedia message that can be accepted. The information in the alerting message indicates the normal capability to accept a multimedia message but not necessarily that communication terminal 104 has present capability to do that. If the user of communication terminal 104 had invoked a feature such as send all calls, call application 229 transmits back a call proceeding message containing the information with respect to the ability to record and the capacity to accept multimedia messages. If call application 229 had been alerting the user and the user does not respond within an appropriate amount of time, call application 209 takes the steps outlined in the next paragraph.

After it has been determined that the user of communication terminal 104 is not going to respond to the incoming call, call application 209 turns over control of the call to message application 211. Message application 211 indicates to the user of communication terminal 101 that it is possible to leave a multimedia message and what media can be used for this message. If the user of communication terminal 101 chooses to leave a message, communication terminal 101 records that message under control of message application 211. After the user has recorded the multimedia message, messaging application 211 transmits an inquiry using a notify message to messaging application 231 to determine if communication terminal 104 has the capacity to store the recorded multimedia message. If messaging application 231 determines that communication terminal 104 does have the capabilities to store the message, it transmits back a second notifying message requesting the transfer of the recorded multimedia message as packetized data. The recorded multimedia message will then be stored in communication terminal 104 in a message storage such as element 306 illustrated in FIG. 3. If communication terminal 104 does not have the present capacity to store the recorded multimedia message, that fact is communicated back to messaging application 211 via a notify message. Messaging application 211 then determines if communication terminal 101 can store the message. If communication terminal 101 has the present capacity to store the recorded multimedia message, that message is stored in message storage unit 306, and a notify message is sent back to messaging application 231 informing it that the multimedia message is stored on communication terminal 101. Messaging application 23 1 records in a location table the fact that this message is stored on communication terminal 101. In addition, both messaging applications 211 and 231 record in a capability table the fact that the other communication terminal has the capability for storing multimedia communication messages and includes in the stored message the type of media that can be stored by a particular communication terminal.

If communication terminal 101 does not have the capacity to store the recorded multimedia message, messaging application 211 sends messages to the messaging applications in communication terminals 103 and 104. This assumes that communication terminals 102 and 103 are listed as having capacity to store messages in the capability table of communication terminal 101. Assuming as was done in the previous example, that communication terminal 103 has the capacity to store the recorded multimedia message, messaging application 211 requests that the lower software layers 200–205 transmit the recorded multimedia message to communication terminal 103 as packetized data. In addition, messaging application 211 causes this multimedia message to be encrypted and transmits the encryption key along with the information that the message is now being stored on communication terminal 103 to message application 231.

The second embodiment is performed in a similar manner with the exception that messaging application 211 first tries to store the multimedia message on the originating terminal.

In either embodiment, a broadcast multimedia message is recorded and stored on communication terminal 101 assuming that it has the ability to record and capacity to store. Messaging application 211 sends messages to each of the messaging applications on the other communication terminals which are to receive the broadcast message. These messages indicate that there is a multimedia message for each of the other communication terminals stored on communication terminal 101.

Consider now FIG. 3 which illustrates the internal hardware construction of communication terminal 101 in greater detail. The other communication terminals would have similar internal structures. Software layers 200–206 are executed by processor 301 that has its programs stored in ROM 302 and data stored in RAM 303. The storage and retrieval of multimedia messages is performed by digital signal processor (DSP) 304 under control of processor 301. If processor 301 has sufficient processing capabilities, the functions performed by DSP 304 will be performed by processor 301. The messages are stored in message storage 306 that advantageously may be a hard disk drive or other storage media. Processor 301 also controls controller 307. Controller 307 is utilized to properly format information being received from DSP 304 via bus 309 or from link interface 313 via bus 312. Link interface 313 performs the link layer functions with respect to link 111 with respect to information being received and transmitted from or to processor 301 via bus 308. Handset 213 and speaker and microphone 217 provide audio for communication terminal 101; whereas video display 214 and video camera 216 provide video. One skilled in the art could readily see that other media could be added to communication terminal 101.

If communication terminal 101 did not have the ability to store multimedia messages, then message storage 306 would not be present in FIG. 3. In addition, if communication terminal 101 did not have the ability to record messages then DSP 304 would not be present for recording video and speech in the compressed format. The audio and video information would be communicated to a communication terminal that did have the ability to record the multimedia message via controller 307, link interface 313, and link 111.

Figure 5:
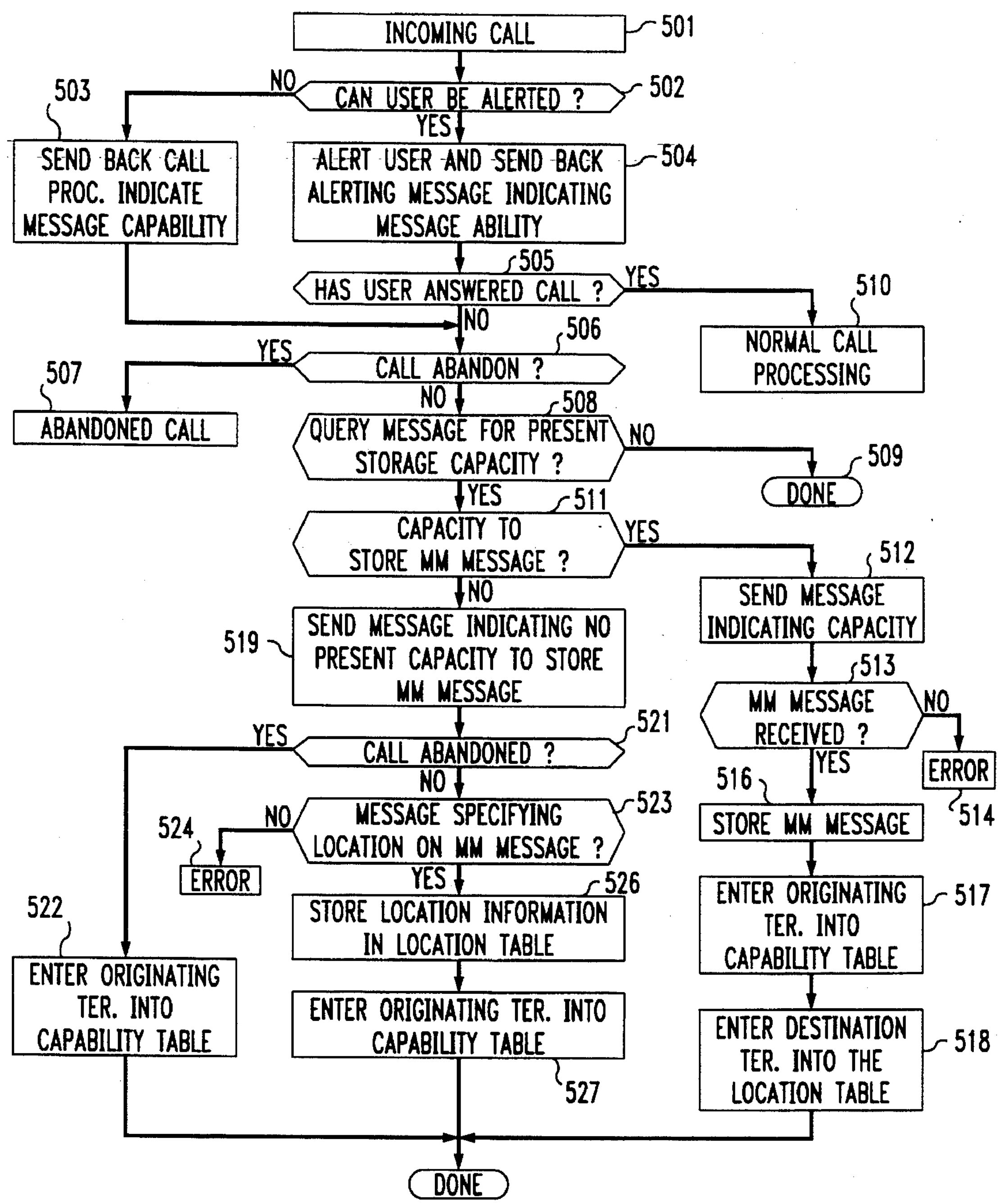
FIG. 5 illustrates, in flow chart form, operations of a messaging application in a destination communication terminal.

FIGS. 4 and 5 illustrate, in flow chart form, the operations of messaging applications in an originating and destination communication terminals, respectively, in implementing the first embodiment. The operations of an originating terminal began when an outgoing call is not answered by the destination terminal as denoted in block 400. Decision block 401 determines if the originating terminal has the ability to record any type of message. If the answer is no, control is transferred to block 411. If the answer in decision block 401 is yes, control is transferred to decision block 402. Decision block 402 determines if the destination terminal had indicated in the alerting or call proceeding message that it had the ability to record and play multimedia messages. This capability is indicated by the fact that the destination terminal had message storage ability to record and playback. If the answer is yes in decision block 402, block 428 displays the resulting message abilities of the originating and destination terminals. The resulting message abilities are those abilities common to both the originating and destination terminals. Control is then transferred to decision block 403. Decision block 403 first indicates to the user that it is possible to record a multimedia message and then waits for the users response. If the user chooses not to leave a message, control again is transferred to block 411 which abandons the call. If the user wishes to leave a message, it must be determined if there is present storage capacity to store such a message. If the answer is yes in decision block 403, decision block 405 determines if the destination terminal has message storage capability. This information was transmitted to the originating terminal by the destination terminal in either the alerting or call proceeding message that is described with respect to FIG. 5. If the destination terminal does have message storage capability, control is transferred to block 404. If the destination terminal does not have message storage capability, control is transferred block 417. When control is transferred to block 404, the latter block sends a message inquiring of the destination terminal if it has present capacity to store a new message. Simply because the destination terminal had message storage capability does not mean that it has the present storage capacity to store a new message since the destination terminal's message storage could be filled. If the answer in decision block 402 is no, then block 411 abandons the call. Decision block 406 then awaits for a response from the destination terminal. If the destination terminal has the capacity to store a new message, control is transferred to block 407. Block 407 indicates to the user that the user can now record a multimedia message and stores the multimedia message in temporary storage on the originating terminal. Block 408 then transmits the multimedia message to the destination terminal as packetized data. Finally, the originating terminal enters the destination terminal into its capability table if the destination terminal is not already entered. The capability table identifies all terminals that the originating terminal has determined have the capability for receiving multimedia messages and indicates the type of media that each of those terminals can handle.

Returning to decision block 406, if the answer is no, decision block 412 determines if the originating terminal has present storage capacity to store a new multimedia message. If the answer is yes, control is transferred to block 413 which records the multimedia message. Block 414 then stores the multimedia message on the originating terminal. Finally, block 416 sends a message to the destination terminal informing that terminal that it has a multimedia message stored on the originating terminal.

If the answer in decision block 412 is no, then control is transferred to block 417. Blocks 417–422 attempt to find a terminal other than the originating and destination terminal that has the present storage capacity to store a new multimedia message. Block 417 accesses the terminal capability table for the first entry in that table or the next entry if control is transferred from decision block 422. Decision block 418 then determines if a terminal was found in the capability terminal. If the answer is no, control is transferred to block 423 which indicates to the user that a message cannot be recorded. If the answer in decision block 418 is yes, control is transferred to block 419. The latter block sends a message inquiring whether the access terminal has the present storage capacity to handle a new message. If the access terminal has the present storage capacity, it transmits back a message to that effect. If it does not have the storage capacity, it transmits back a message saying it does not have that capability. Decision block 421 then receives the message from the accessed terminal. If the accessed terminal indicates that it has the present storage capacity to store a new message, control is transferred to block 424. The latter block records the multimedia message and sends the multimedia message as packetized data to the accessed terminal. Finally, block 427 sends a message to the destination terminal informing it that the multimedia message is stored on the accessed terminal.

Returning to block 421, if the answer is no, decision block 422 determines if there are any more terminals in the terminal capability table. If the answer is yes, control is transferred back to block 417. If the answer is no, control is transferred to block 423 that indicates to the user that the message cannot be recorded.

FIG. 5 illustrates, in flow chart form, the operations performed by the messaging application in a destination communication terminal in implementing the first embodiment. Block 501 detects an incoming call. Decision block 502 determines if the user can be alerted. If the user has invoked a feature such as send all calls, the user cannot be alerted, and decision block 502 transfers control to block 503. Block 503 sends back a call proceeding message to the originating terminal. The call proceeding message also has an indication of the fact that the destination terminal has message capability and defines what media can be utilized. Returning to decision block 502, if the user can be alerted, block 504 alerts the user and sends back an alerting message indicating message capability and the type of media supported. After execution of block 504, block 505 determines if the user has answered the call. If the answer is yes, block 510 processes the call in the normal fashion. If the answer in decision block 505 is no, control is transferred to block 506.

Decision block 506 determines if the originating terminal has abandoned the call. If the answer is yes, block 507 also abandons the call in the destination terminal. If the answer in block 506 is no, decision block 508 awaits a query message inquiring if the destination terminal has present storage capacity to store a multimedia message. If the answer is no, this is indicated by block 509. If the answer in decision block 508 is yes, decision block 511 determines whether the destination terminal has present capacity to store another multimedia message. If the answer is yes, block 512 sends a message to the originating terminal indicating that the destination terminal does have capacity to store another multimedia message. Decision block 513 awaits the transfer of the multimedia message from the originating terminal. If the multimedia message is not received, control is transferred to block 514 which performs error recovery. If the message is received, control is transferred to block 516 that stores the multimedia message. Block 517 then enters the originating terminal into the capability table if the originating terminal is not already entered. Finally, block 518 enters the destination terminal's identification into the location table which specifies the location of multimedia messages for the destination terminal.

Returning to decision block 511, if the destination terminal does not have the capability to store another multimedia message, control is transferred to block 519 that sends a message indicating that there is no present capacity to store the multimedia message to the originating terminal. Decision block 512 then determines if the originating terminal has abandoned the call. If the answer is yes, this indicates that the originating terminal could not find another terminal that had the capacity to store the multimedia message. If the answer is yes in decision block 521, block 522 enters the originating terminal into the terminal capability table.

Returning to decision block 521, if the answer is no, control is transferred to decision block 523. Decision block 523 waits for a message from the originating terminal specifying the location (where the multimedia message is stored). If this message is not received, decision block 523 transfers control to block 524 which does error recovery. If the message is received, decision block 523 transfers control to block 526 that stores the location information in the location table. Finally, block 527 enters the originating terminal into the capability table if it is not already been entered.

Figure 6:
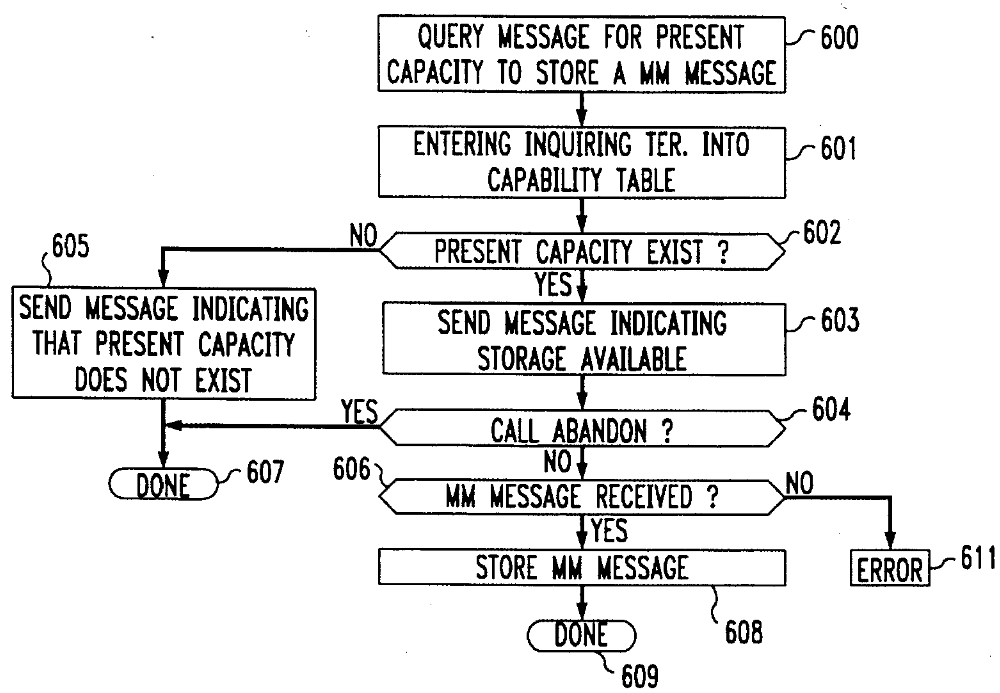
FIG. 6 illustrates, in flow chart form, additional operations performed by a messaging application in a communication terminal.

FIG. 6 illustrates the operations performed by a communication terminal other than the originating or destination communication terminals in implementing both the first and second embodiment of the invention. Block 600 determines when a query message has been received inquiring if the terminal has present capacity to store a multimedia message. Block 601 enters the inquiring terminal's identification into the capability table. Block 602 determines whether there is present capacity in the terminal to store another multimedia message. If there is not present capacity, control is transferred to block 605 which sends a message indicating that present capacity does not exist to the inquiring terminal. If there is present capacity to store another multimedia message, decision block 602 transfers control to block 603 which sends a message to the inquiring terminal indicating that storage is available to store another multimedia message. After transmission of the message, control is transferred to decision block 604 which checks to see if the inquiring terminal has abandoned the call. If the answer is yes, control is transferred to block 607 since the operation is finished. If the answer in decision block 604 is no, control is transferred to decision block 606 which determines if a multimedia message has been received. If the answer is no, block 611 does error recovery. If the answer is yes, block 608 stores the multimedia message.

Figure 7:
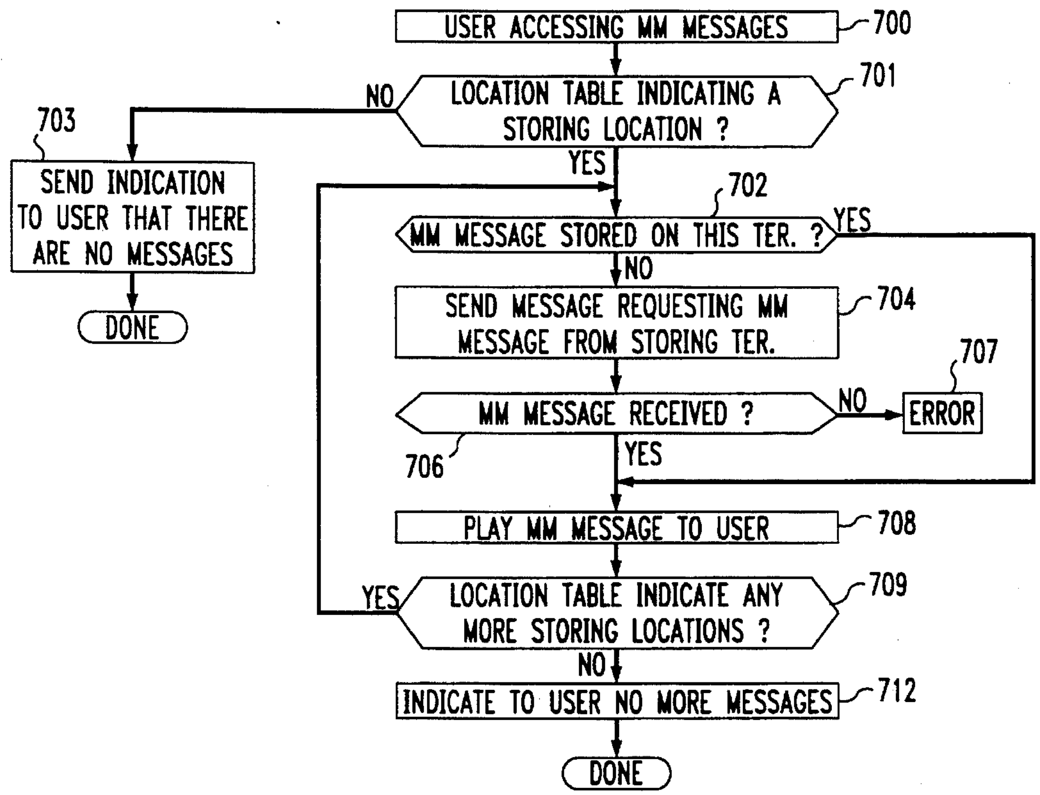
FIG. 7 illustrates, in flow chart form, operations of a communication terminal in accessing multimedia messages.

FIG. 7 illustrates, in flow chart form, the operations performed by communication terminal when the user wishes to access the stored multimedia messages. Decision block 701 determines if the location table indicates any storing locations. If the answer is no, block 703 sends an indication to the user that there are no messages. If the answer is yes in decision block 701, decision block 702 accesses the location table and obtains the location of the first message. Decision block 702 determines if the multimedia is stored on this terminal. If the answer is yes, control is transferred to block 708 which will be described later in this paragraph. If the answer is no in decision block 702, block 704 sends a message requesting the multimedia message from the storing terminal. The storing terminal is responsive to this message to transmit the multimedia message to the terminal executing FIG. 7 as packetized data. Decision block 706 determines if a multimedia message was received. If the answer is no, block 707 does error recovery. If the answer is yes, block 708 plays the multimedia message to the user. Next, decision block 709 determines if the location table indicates any more storing locations. If the answer is yes, control is transferred back to decision block 702. If the answer is no, block 712 indicates to the user that there are no more messages.

FIG. 8 illustrate, in flow chart form, the operations of a messaging application in an originating communication terminals, respectively, in implementing the second embodiment. The operations of an originating terminal began when an outgoing call is not answered by the destination terminal as denoted in block 800. Block 801 determines if the originating terminal has the capability of recording a message and the corresponding ability to playback a message. If the answer is no, control is transferred to block 811 which abandons the call. If the answer in decision block 801 is yes, control is transferred to decision block 802. Decision block 802 determines if the destination terminal had indicated in the alerting or call proceeding message that it had the capability to handle multimedia messages. This capability is indicated by the fact that the destination terminal has the ability to record and playback messages. If the answer in decision block 802 is no, then block 811 abandons the call. If the answer is yes in decision block 802, control is transferred to block 805 which displays to the user the common message abilities of the originating and destination terminal which define the media that the user can utilize to leave a message. After execution of block 805, decision block 803 first indicates to the user that it is possible to record a multimedia message and then waits for the users response. If the user chooses not to leave a message, control again is transferred to block 811 which abandons the call. If the user wishes to leave a message, it must be determined if there is present storage capacity to store such a message. If the answer is yes in decision block 803, block 812 is executed which determines if the originating terminal has present capacity to store a new message. If the answer is yes, control is transferred to block 813 which records the multimedia message. Block 814 then stores the multimedia message on the originating terminal. Finally, block 816 sends a message to the destination terminal informing that terminal that it has a multimedia message stored on the originating terminal.

Returning to decision block 812, if the answer is no, control is transferred to block 810 which determines if the destination terminal has message storage capability. Simply because the destination terminal had message storage capability does not mean that it has the present storage capacity to store a new message since the destination terminals message storage could be filled. If the answer in decision block 810 is yes, control is transferred to block 804. If the answer in decision block 810 is no, control is transferred to block 817. Block 804 sends a message inquiring of the destination terminal if it has present capacity to store a new message. Decision block 806 then awaits for a response from the destination terminal. If the destination terminal has the capacity to store a new message, control is transferred to block 807. Block 807 indicates to the user that the user can now record a multimedia message and stores the multimedia message in temporary storage on the originating terminal. Block 808 then transmits the multimedia message to the destination terminal as packetized data. Finally, the originating terminal enters the destination terminal into its capability table if the destination terminal is not already entered. The capability table identifies all terminals that the originating terminal has determined have the capability for receiving multimedia messages and indicates the type of media that each of those terminals can handle.

If the answer in decision block 806 is no, then control is transferred to block 817. Blocks 817–822 attempt to find a terminal other than the originating and destination terminal that has the present storage capacity to store a new multimedia message. Block 817 accesses the terminal capability table for the first entry in that table or the next entry if control is transferred from decision block 822. Decision block 818 then determines if a terminal was found in the capability terminal. If the answer is no, control is transferred to block 823 which indicates to the user that a message cannot be recorded. If the answer in decision block 818 is yes, control is transferred to block 819. The latter block sends a message inquiring whether the access terminal has the present storage capacity to handle a new message. If the access terminal has the present storage capacity, it transmits back a message to that effect. If it does not have the storage capacity, it transmits back a message saying it does not have that capability. Decision block 821 then receives the message from the accessed terminal. If the accessed terminal indicates that it has the present storage capacity to store a new message, control is transferred to block 824. The latter block records the multimedia message and sends the multimedia message as packetized data to the accessed terminal. Finally, block 827 sends a message to the destination terminal informing it that the multimedia message is stored on the accessed terminal.

Returning to block 821, if the answer is no, decision block 822 determines if there are any more terminals in the terminal capability table. If the answer is yes, control is transferred back to block 817. If the answer is no, control is transferred to block 823 that indicates to the user that the message cannot be recorded.

Figure 9:
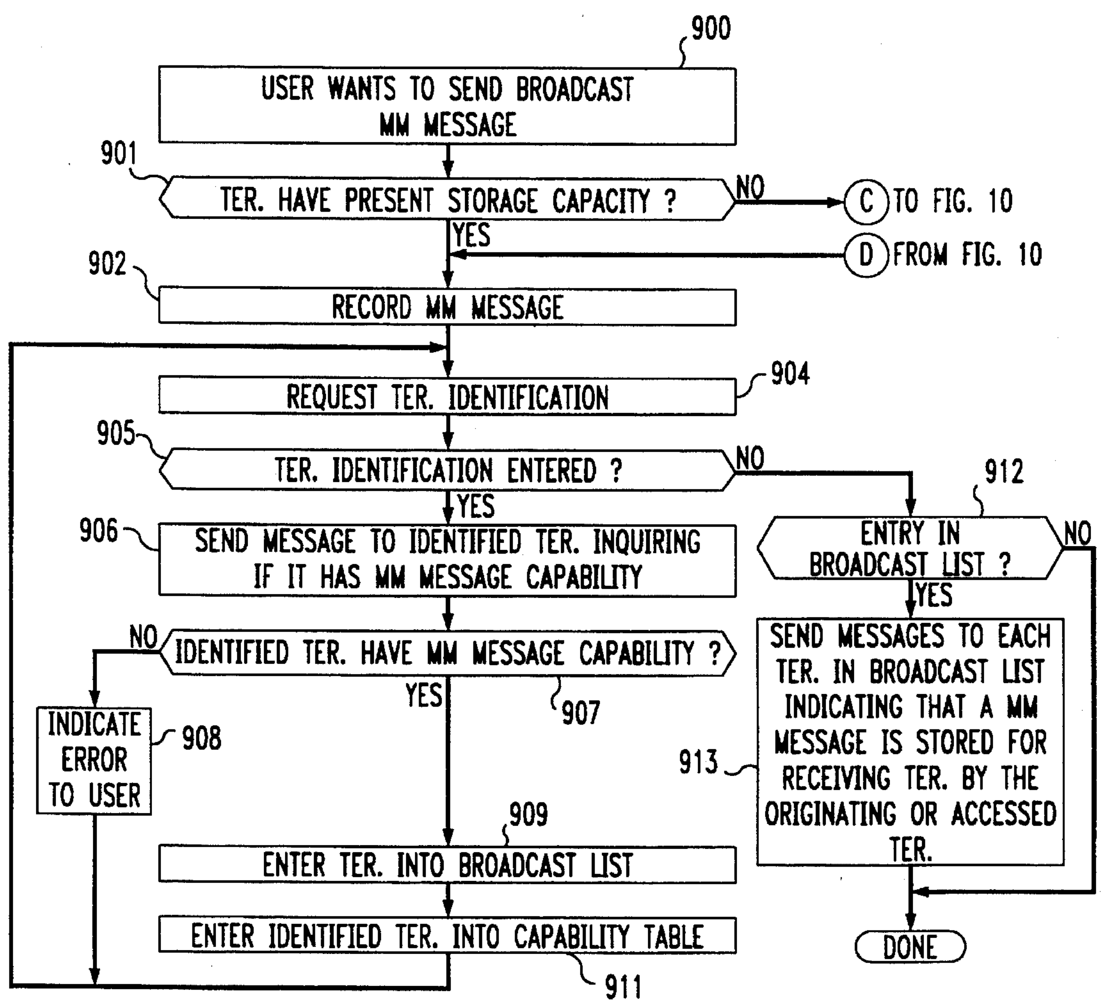
FIGS. 9 and 10 illustrate, in flow chart form, operations of an originating terminal in providing a broadcast multimedia message.
Figure 10:
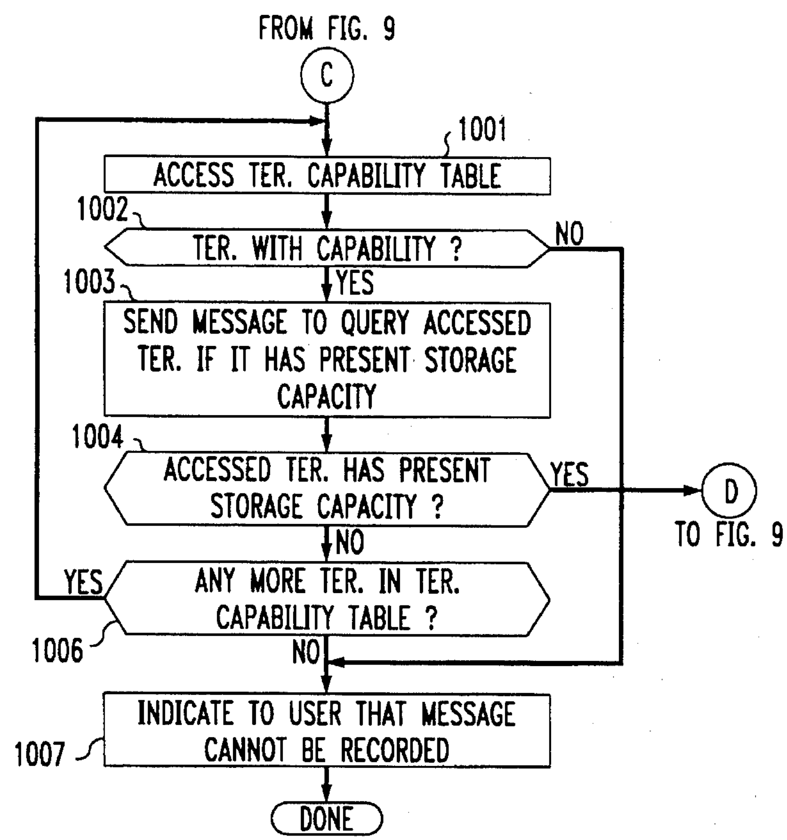

FIGS. 9 and 10 illustrate, in flow chart form, the operations performed by a communication terminal in providing a broadcast message. A broadcast message is stored on the originating communication terminal until it is requested by a destination terminal. This is true for both embodiments. Block 900 determines when the user wants to send a broadcast multimedia message. Decision block 901 then determines whether the terminal has sufficient storage capacity to record and store such a message. If the answer is no, control is transferred to block 1001 of FIG. 10. Block 1001 accesses the capability table to determine if there is another terminal which could store the broadcast message. Decision block 1002 determines if there is such a terminal that has the necessary storage capability. If the answer is no, control is transferred to block 1007 which indicates to the user that the message cannot be recorded. If the answer is yes in decision block 1002, block 1003 sends a message to inquire whether the access terminal has present storage capacity. Decision block 1004 waits until the access terminal sends back a response to the query and if there is storage capacity on the access terminal, control is transferred to block 902 of FIG. 9. If the answer in decision block 1004 is no, control is transferred to decision block 1006 which determines if there any more terminals in the terminal capability table that have not yet been queried. If the answer is yes in decision block 1006, control is transferred back to block 1001. If the answer is no in decision block 1006, control is transferred to block 1007 which has already been described. If the answer in decision block 901 is yes or another terminal was found in FIG. 10, block 902 records the message.

Block 904 requests the identification of the first terminal to which the broadcast multimedia message is going to be sent. Decision block 905 determines if a terminal identification was entered. If the answer is no, control is transferred to decision block 912 which determines if there are any entries in the broadcast list. If the answer is no, no action is taken. If the answer in decision block 912 is yes, block 913 sends messages to each terminal in the broadcast list which was assembled by block 909 indicating that a multimedia message is stored for the receiving terminal on the sending terminal. Returning to decision block 904, if the answer is yes, block 906 sends a message to the identified terminal inquiring if it has multimedia messaging capability. Block 907 then awaits for a reply from the identified terminal. If the identified terminal does not have multimedia message capability, block 908 indicates an error to the user and transfers control back to block 903. If the answer in decision block 907 is yes, block 909 enters the terminal into the broadcast list, and block 911 enters the identified terminal into the capability table. Control is then transferred back to block 903. As previously discussed, after the user has entered all of the terminals to which the broadcast multimedia message is to be sent, control is transferred to decision block 912. Decision block 912 checks the broadcast list to make sure that there is at least one entry in the list. If there is at least one entry in the broadcast list, block 913 sends messages to each terminal identified in the broadcast list indicating that a multimedia message is stored for that terminal by the sending terminal.

Figure 11:
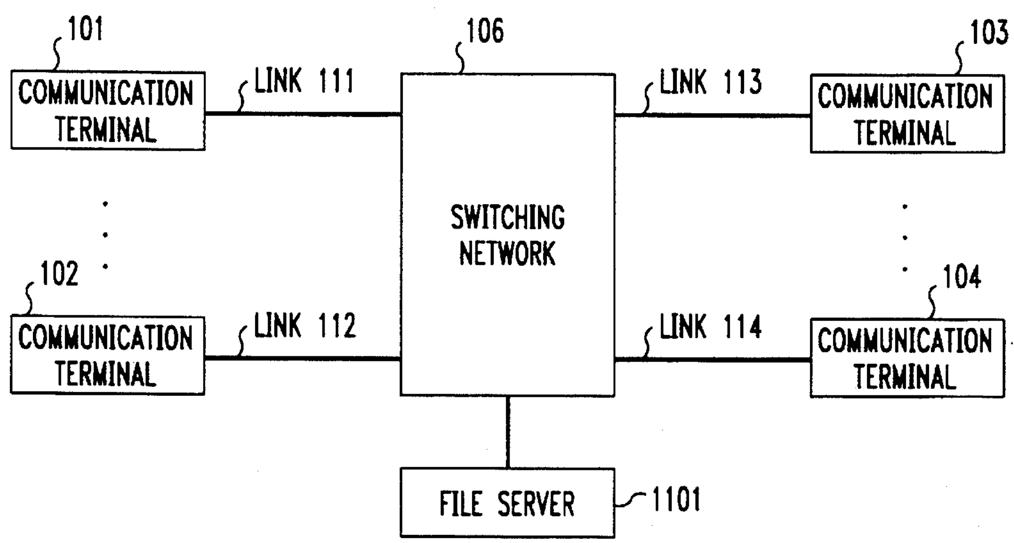
FIG. 11 illustrates a third embodiment of the invention.

FIG. 11 illustrates the system of FIG. 1 with the addition of file server 1101. File server 1101 contains a large amount of message storage space and is utilized by the communication terminals of FIG. 11 to store messages if no communication terminals have any present capacity to store messages.

It is to be understood that the above-described embodiments are merely illustrative of the principles of the invention and that other arrangements may be devised by those skilled in the art without departing from the spirit and scope of the invention.

The invention claimed is:

1. A method of storing multimedia messages in a plurality of communication terminals, the method comprising:

placing a telecommunication call by an originating one of the plurality of communication terminals to a destination one of the plurality of communication terminals;

recording a multimedia message by the originating one of the plurality of communication terminals;

identifying another one of the plurality of communication terminals that has present capacity to store the multimedia message upon the destination and originating ones of the plurality of communication terminals not having present capacity to store the multimedia message; and storing the multimedia message in the identified one of the plurality of communication terminals.

2. The method of claim 1 wherein the step of recording comprises the step of the originating one of the plurality of communication terminals placing the telecommunication call to the destination one of the plurality of communication terminals which is not answered by the destination one of the plurality of communication terminals.

3. The method of claim 2 wherein the step of identifying identifies the originating one of the plurality of communication terminals upon the originating one of the plurality of communication terminals having present capacity to store the multimedia message;

the step of identifying identifies the destination one of the plurality of communication terminals upon the originating one the plurality of communication terminals not having present capacity to store the multimedia message and the destination one the plurality of communication terminals having present capacity to store the multimedia message;

the step of storing comprises the steps of transmitting the multimedia message by the originating one of the plurality of communication terminals to the destination one of the plurality of communication terminals upon the destination one of the plurality of communication terminals being identified; and storing the transmitted multimedia message in the destination one of the plurality of communication terminals upon the destination one of the plurality of communication terminals being identified.

4. The method of claim 3 further comprises the step of transmitting to the destination one of the plurality of communication terminals an identification of the identified one of the plurality of communication terminals upon the originating one of the plurality of communication terminals being identified thereby informing the destination one of the plurality of communication terminals that the originating one of the plurality of communication terminals has stored the multimedia message.

5. The method of claim 3 wherein the step of storing further comprises the steps of transmitting the multimedia message by the originating one of the plurality of communication terminals to the other one of the plurality of communication terminals upon the other one of the plurality of communication terminals being identified; and storing the multimedia message in the other one of the plurality of communication terminals upon the other one of the plurality of communication terminals being identified.

6. The method of claim 5 further comprises the step of transmitting to the destination one of the plurality of communication terminals an identification of the identified one of the plurality of communication terminals upon the other one of the plurality of communication terminals being identified thereby informing the destination one of the plurality of communication terminals that the other one of the plurality of communication terminals has stored the multimedia message.

7. The method of claim 6 further comprises the steps of accessing the multimedia message by the destination one of the plurality of communication terminals in response to a request from a user of the destination one of the plurality of communication terminals; and playing the multimedia message to the user via the destination one of the plurality of communication terminals.

8. The method of claim 7 wherein the step of accessing comprises the steps of determining the identified one of the plurality of communication terminals by the transmitted identification; and requesting the multimedia message from the identified one of the plurality of communication terminals.

9. The method of claim 2 wherein the step of identifying identifies the destination one of the plurality of communication terminals upon the destination one of the plurality of communication terminals having present capacity to store the multimedia message;

the step of storing comprises the steps of transmitting the multimedia message by the originating one of the plurality of communication terminals to the destination one of the plurality of communication terminals upon the destination one of the plurality of communication terminals being identified;

storing the transmitted multimedia message in the destination one of the plurality of communication terminals upon the destination one of the plurality of communication terminals being identified;

the step of identifying identifies the originating one of the plurality of communication terminals upon the destination one of the plurality of communication terminals not having present capacity to store the multimedia message and the originating one of the plurality of communication terminals having present capacity to store the multimedia message; and storing the multimedia message in the originating one of the plurality of communication terminals upon the originating one of the plurality of communication terminals being identified.

10. The method of claim 9 further comprises the step of transmitting to the destination one of the plurality of communication terminals identification of the identified one of the plurality of communication terminals upon the originating one of the plurality of communication terminals being identified thereby informing the destination one of the plurality of communication terminals that the originating one of the plurality of communication terminals has stored the multimedia message.

11. The method of claim 9 wherein the step of storing further comprises the steps of transmitting the multimedia message by the originating one of the plurality of communication terminals to the other one of the plurality of communication terminals upon the other one of the plurality of communication terminals being identified; and storing the multimedia message in the other one of the plurality of communication terminals upon other one of the plurality of communication terminals being identified.

12. The method of claim 11 further comprises the step of transmitting to the destination one of the plurality of communication terminals identification of the identified one of the plurality of communication terminals upon other one of the plurality of communication terminals being identified thereby informing the destination one of the plurality of communication terminals that the other one of the plurality of communication terminals has stored the multimedia message.

13. The method of claim 11 further comprises the steps of accessing the multimedia message by the destination one of the plurality of communication terminals in response to a request from a user of the destination one of the plurality of communication terminals; and playing the multimedia message to the user via the destination one of the plurality of communication terminals.

14. The method of claim 13 wherein the step of accessing comprises the steps of determining the identified one of the plurality of communication terminals by the transmitted identification; and requesting the multimedia message from the identified one of the plurality of communication terminals.

15. The method of claim 1 wherein the step of recording further comprises the step of receiving a list of destination ones of the plurality of communication terminals to which the multimedia message is to be sent; and transmitting to each of the communication terminals identified on the list information identifying that the multimedia message has been stored for each of the communication terminals identified on the list and designating the identified one of the plurality of the communication terminals as storing the multimedia message.

16. The method of claim 15 further comprises the step of storing the transmitted information by each of the communication terminals identified on the list.

17. The method of claim 16 wherein the step of recording comprises the step of requesting by an originating one of the plurality of communication terminals to send the multimedia message to the communication terminals identified on the list.

18. The method of claim 17 wherein the step of identifying identifies originating one of the plurality of communication terminals upon the originating one of the plurality of communication terminals having present capacity to store the multimedia message.

19. The method of claim 18 wherein the step of identifying comprises the step of determining another one of the plurality of communication terminals upon the originating one of the plurality of communication terminals not having present capacity to store the multimedia message.

20. The method of claim 19 further comprises the steps of accessing the multimedia message by one of the communication terminals on the list in response to a request from a user of the one of the communication terminals on the list; and playing the multimedia message to the user via the one of the communication terminals on the list.

21. The method of claim 20 wherein the step of accessing comprises the steps of determining the identified one of the plurality of communication terminals by the transmitted information; and requesting the multimedia message from the identified one of the plurality of communication terminals.

22. An apparatus of storing multimedia messages in a plurality of communication terminals, comprising:

means in an originating one of the plurality of communication terminals for placing a telecommunication call to a destination of the plurality of communication terminals;

means for recording a multimedia message by the originating one of the plurality of communication terminals;

means for identifying another one of the plurality of communication terminals that has present capacity to store the multimedia message upon the destination and originating ones of the plurality of communication terminals not having present capacity to store the multimedia message; and means for storing the multimedia message in the identified one of the plurality of communication terminals.

23. The apparatus of claim 22 wherein the means for recording comprises means for the originating one of the plurality of communication terminals placing the telecommunication call to the destination one of the plurality of communication terminals which is not answered by the destination one of the plurality of communication terminals.

24. The apparatus of claim 23 wherein the means for identifying identifies the originating one of the plurality of communication terminals upon the originating one of the plurality of communication terminals having present capacity to store the multimedia message;

the means for identifying identifies the destination one of the plurality of communication terminals upon the originating one the plurality of communication terminals not having present capacity to store the multimedia message and the destination one the plurality of communication terminals having present capacity to store the multimedia message;

the means for storing comprises means for transmitting the multimedia message by the originating one of the plurality of communication terminals to the destination one of the plurality of communication terminals upon the destination one of the plurality of communication terminals being identified; and means for storing the transmitted multimedia message in the destination one of the plurality of communication terminals upon the destination one of the plurality of communication terminals being identified.

25. The apparatus of claim 24 further comprises means for transmitting to the destination one of the plurality of communication terminals an identification of the identified one of the plurality of communication terminals upon the originating one of the plurality of communication terminals being identified thereby informing the destination one of the plurality of communication terminals that the originating one of the plurality of communication terminals has stored the multimedia message.

26. The apparatus of claim 24 wherein the means for storing further comprises means for transmitting the multimedia message by the originating one of the plurality of communication terminals to the other one of the plurality of communication terminals upon the other one of the plurality of communication terminals being identified; and means for storing the multimedia message in the other one of the plurality of communication terminals upon the other one of the plurality of communication terminals being identified.

27. The apparatus of claim 26 further comprises means for transmitting to the destination one of the plurality of communication terminals an identification of the identified one of the plurality of communication terminals upon the other one of the plurality of communication terminals being identified thereby informing the destination one of the plurality of communication terminals that the other one of the plurality of communication terminals has stored the multimedia message.

28. The apparatus of claim 27 further comprises means for accessing the multimedia message by the destination one of the plurality of communication terminals in response to a request from a user of the destination one of the plurality of communication terminals; and means for playing the multimedia message to the user via the destination one of the plurality of communication terminals.

29. The apparatus of claim 28 wherein the means for accessing comprises means for determining the identified one of the plurality of communication terminals by the transmitted identification; and means for requesting the multimedia message from the identified one of the plurality of communication terminals.

30. The apparatus of claim 23 wherein the means for identifying identifies the destination one of the plurality of communication terminals upon the destination one of the plurality of communication terminals having present capacity to store the multimedia message;

the means for storing comprises means for transmitting the multimedia message by the originating one of the plurality of communication terminals to the destination one of the plurality of communication terminals upon the destination one of the plurality of communication terminals being identified;

means for storing the transmitted multimedia message in the destination one of the plurality of communication terminals upon the destination one of the plurality of communication terminals being identified;

the means for identifying identifies the originating one of the plurality of communication terminals upon the destination one of the plurality of communication terminals not having present capacity to store the multimedia message and the originating one of the plurality of communication terminals having present capacity to store the multimedia message; and means for storing the multimedia message in the originating one of the plurality of communication terminals upon the originating one of the plurality of communication terminals being identified.

31. The apparatus of claim 30 further comprises means for transmitting to the destination one of the plurality of communication terminals identification of the identified one of the plurality of communication terminals upon the originating one of the plurality of communication terminals being identified thereby informing the destination one of the plurality of communication terminals that the originating one of the plurality of communication terminals has stored the multimedia message.

32. The apparatus of claim 30 wherein the means for storing further comprises means for transmitting the multimedia message by the originating one of the plurality of communication terminals to the other one of the plurality of communication terminals upon the other one of the plurality of communication terminals being identified; and means for storing the multimedia message in the other one of the plurality of communication terminals upon other one of the plurality of communication terminals being identified.

33. The apparatus of claim 32 further comprises means for transmitting to the destination one of the plurality of communication terminals identification of the identified one of the plurality of communication terminals upon other one of the plurality of communication terminals being identified thereby informing the destination one of the plurality of communication terminals that the other one of the plurality of communication terminals has stored the multimedia message.

34. The apparatus of claim 32 further comprises means for accessing the multimedia message by the destination one of the plurality of communication terminals in response to a request from a user of the destination one of the plurality of communication terminals; and means for playing the multimedia message to the user via the destination one of the plurality of communication terminals.

35. The apparatus of claim 34 wherein the means for accessing comprises means for determining the identified one of the plurality of communication terminals by the transmitted identification; and means for requesting the multimedia message from the identified one of the plurality of communication terminals.

36. The apparatus of claim 22 wherein the means for recording further comprises means for receiving a list of destination ones of the plurality of communication terminals to which the multimedia message is to be sent; and means for transmitting to each of the communication terminals identified on the list information identifying that the multimedia message has been stored for each of the communication terminals identified on the list and designating the identified one of the plurality of communication terminals as storing the multimedia message.

37. The apparatus of claim 36 further comprises means for storing the transmitted information by each of the communication terminals identified on the list.

38. The apparatus of claim 37 wherein the means for recording comprises means for requesting by an originating one of the plurality of communication terminals to send the multimedia message to the communication terminals identified on the list.

39. The apparatus of claim 38 wherein the means for identifying identifies originating one of the plurality of communication terminals upon the originating one of the plurality of communication terminals having present capacity to store the multimedia message.

40. The apparatus of claim 39 wherein the means for identifying comprises means for determining another one of the plurality of communication terminals upon the originating one of the plurality of communication terminals not having present capacity to store the multimedia message.

41. The apparatus of claim 40 further comprises means for accessing the multimedia message by one of the communication terminals on the list in response to a request from a user of the one of the communication terminals on the list; and means for playing the multimedia message to the user via the one of the communication terminals on the list.

42. The apparatus of claim 41 wherein the means for accessing comprises means for determining the identified one of the plurality of communication terminals by the transmitted information; and means for requesting the multimedia message from the identified one of the plurality of communication terminals.

* * * * *